J. Temple,
Boring Wood,
Nº 14,327. Patented Feb. 26, 1856.

UNITED STATES PATENT OFFICE.

JAS. TEMPLE, OF BIRMINGHAM, PENNSYLVANIA.

BORING-MACHINE.

Specification of Letters Patent No. 14,327, dated February 26, 1856.

*To all whom it may concern:*

Be it known that I, JAMES TEMPLE, of Birmingham, in the county of Huntington and State of Pennsylvania, have invented a new and useful Improvement in Boring Machinery; and I do hereby declare that the following is a full, clear, and exact description of the same, reference being had to the annexed drawing, forming part of this specification, in which—

Figure 1:
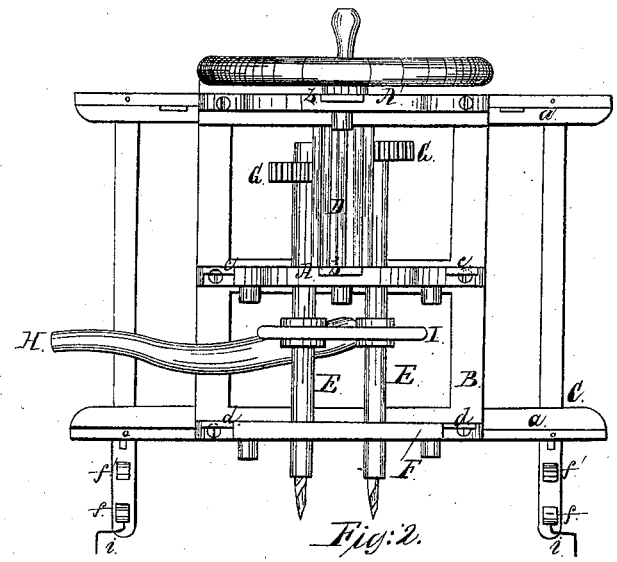
Figure 2:
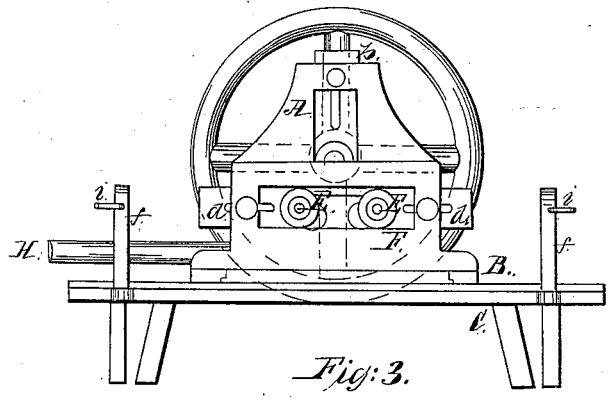
Figure 3:
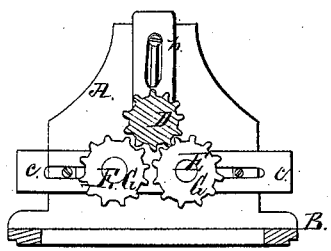

Figure 1 is a plan of the machine. Fig. 2 is an end elevation of the machine looking toward pinions. Fig. 3 is a vertical section through long pinion looking toward driving pinions.

Similar letters in the several figures denote the same part of the machine.

The nature of my invention consists in hanging the boring shafts and long pinion in slides movable in the supporting standards; the former horizontally and the latter vertically; so that the change of distance between the boring shafts may take place horizontally and the long pinion be made to mesh with the driving pinions in every such position; this separation of the boring shafts horizontally being advantageous from the fact that the sustaining screws can thus be directly behind the line of perforation for every distance between the holes—a condition not to be fulfilled in any other machine of this character.

In the drawing A A' are the standards upon a frame B, traversing on guides $a$ $a$ of main frame C. In both standards are vertically moving slides $b$, constituting bearings of the long pinion D. In standard A are two slides $c$ $c$, movable outward, and forming bearings of the boring shafts E E. All of these slides are held in any given position by screws. The boring ends of the shafts E are supported by slides $d$ $d$ movable in a head piece F, to correspond with the movement of the slides $c$ $c$.

The rear extremities of the shafts are furnished with pinions G meshing with long pinion D. These shafts move longitudinally by means of lever H, attached to open cross piece I embracing grooves in the shafts; or, any other suitable device may be adopted.

From the main frame arise the standards $f$ $f'$, between which the article to be bored is held, supported in position by screws $i$ through the standards $f$. These screws are so placed as to be directly behind the line of perforation; or, in other words so that their axes shall lie in the same plane as the axes of the boring shafts. This position they will maintain for every position of said shafts.

In operating this machine the boring shafts are adjusted to the requisite distance apart by the slides $c$ and $d$, and there secured. The long pinion being adjusted to mesh with the driving pinions by means of slides $b$ $b$. The timber is secured between standards $f$ $f'$ by screws $i$, and as the shafts rotate, they are gradually moved forward by lever H.

One advantage of this construction not yet mentioned, is the facility for placing large driving pinions on the shafts when holes of large diameter are to be bored.

I claim—

The combination of the horizontal and vertical slides $b$ and $c$, arranged and operating substantially as, and for the purposes specified.

In testimony whereof, I have hereunto signed my name before two subscribing witnesses.

J. TEMPLE.

Witnesses:
GEO. PATTEN,
JAMES BROWN.